(12) United States Patent
Fukushima et al.

(10) Patent No.: US 11,735,991 B2
(45) Date of Patent: Aug. 22, 2023

(54) ACTUATOR

(71) Applicant: THK CO., LTD., Tokyo (JP)

(72) Inventors: Katsuya Fukushima, Tokyo (JP); Masashi Ishii, Tokyo (JP); Hiroki Niwa, Tokyo (JP); Akira Suzuki, Tokyo (JP); Kazuto Oga, Tokyo (JP); Shogo Wakuta, Tokyo (JP); Satoshi Hara, Tokyo (JP); Tomofumi Mizuno, Tokyo (JP); Shigeki Hayashi, Kawasaki (JP)

(73) Assignee: THK CO., LTD., Tokyo (JP)

( * ) Notice: Subject to any disclaimer, the term of this patent is extended or adjusted under 35 U.S.C. 154(b) by 290 days.

(21) Appl. No.: 17/284,932

(22) PCT Filed: Oct. 8, 2019

(86) PCT No.: PCT/JP2019/039633
§ 371 (c)(1),
(2) Date: Apr. 13, 2021

(87) PCT Pub. No.: WO2020/080181
PCT Pub. Date: Apr. 23, 2020

(65) Prior Publication Data
US 2021/0379760 A1    Dec. 9, 2021

(30) Foreign Application Priority Data
Oct. 19, 2018    (JP) .................................. 2018-197700

(51) Int. Cl.
*H02P 25/06*    (2016.01)
*H02K 41/03*    (2006.01)

(52) U.S. Cl.
CPC .......... *H02K 41/031* (2013.01); *H02P 25/06* (2013.01)

(58) Field of Classification Search
CPC ....... H02P 25/06; H02K 41/03; H02K 41/031
See application file for complete search history.

(56) References Cited

U.S. PATENT DOCUMENTS

| 8,786,219 B2 * | 7/2014 | Ikeda ........................ H02P 5/52 |
| | | 318/7 |
| 10,498,263 B2 * | 12/2019 | Nomura ................. B65G 47/91 |

(Continued)

FOREIGN PATENT DOCUMENTS

| CA | 1 199 691 A | 1/1986 |
| JP | 1-140307 A | 6/1989 |

(Continued)

OTHER PUBLICATIONS

Office Action dated Aug. 25, 2022, issued in counterpart IN application No. 202147021429. (6 pages).

(Continued)

*Primary Examiner* — Thai T Dinh
(74) *Attorney, Agent, or Firm* — WHDA, LLP

(57) ABSTRACT

In an actuator, an unnecessarily large load is prevented from being applied to a shaft and a workpiece. There are included a force sensor, an output of which is according to a force applied to a connecting member connected to the shaft, an amplifier that amplifies the output of the force sensor, and a low-pass filter, and a load applied to the shaft is detected based on an output from the amplifier until the shaft or a member associated with the shaft comes in contact with another member, and thereafter, the load applied to the shaft is detected based on an output from the low-pass filter.

12 Claims, 8 Drawing Sheets

(56) References Cited

U.S. PATENT DOCUMENTS

| | | | | |
|---|---|---|---|---|
| 2002/0041549 A1* | 4/2002 | Obara | ................... | G11B 7/261 |
| 2004/0208094 A1* | 10/2004 | Obara | ................... | G11B 7/261 |
| 2015/0359437 A1* | 12/2015 | Maltz | ................... | A61B 5/6828 |
| | | | | 600/481 |

FOREIGN PATENT DOCUMENTS

| | | |
|---|---|---|
| JP | 4-25390 A | 1/1992 |
| JP | 2001-68895 A | 3/2001 |
| JP | 2009-66739 A | 4/2009 |
| JP | 2009-83017 A | 4/2009 |
| JP | 2009-164347 A | 7/2009 |
| JP | 2017-77051 A | 4/2017 |

OTHER PUBLICATIONS

International Search Report dated Dec. 10, 2019, issued in counterpart International Application No. PCT/JP2019/039633, w/English translation (4 pages).

* cited by examiner

[Fig. 1]
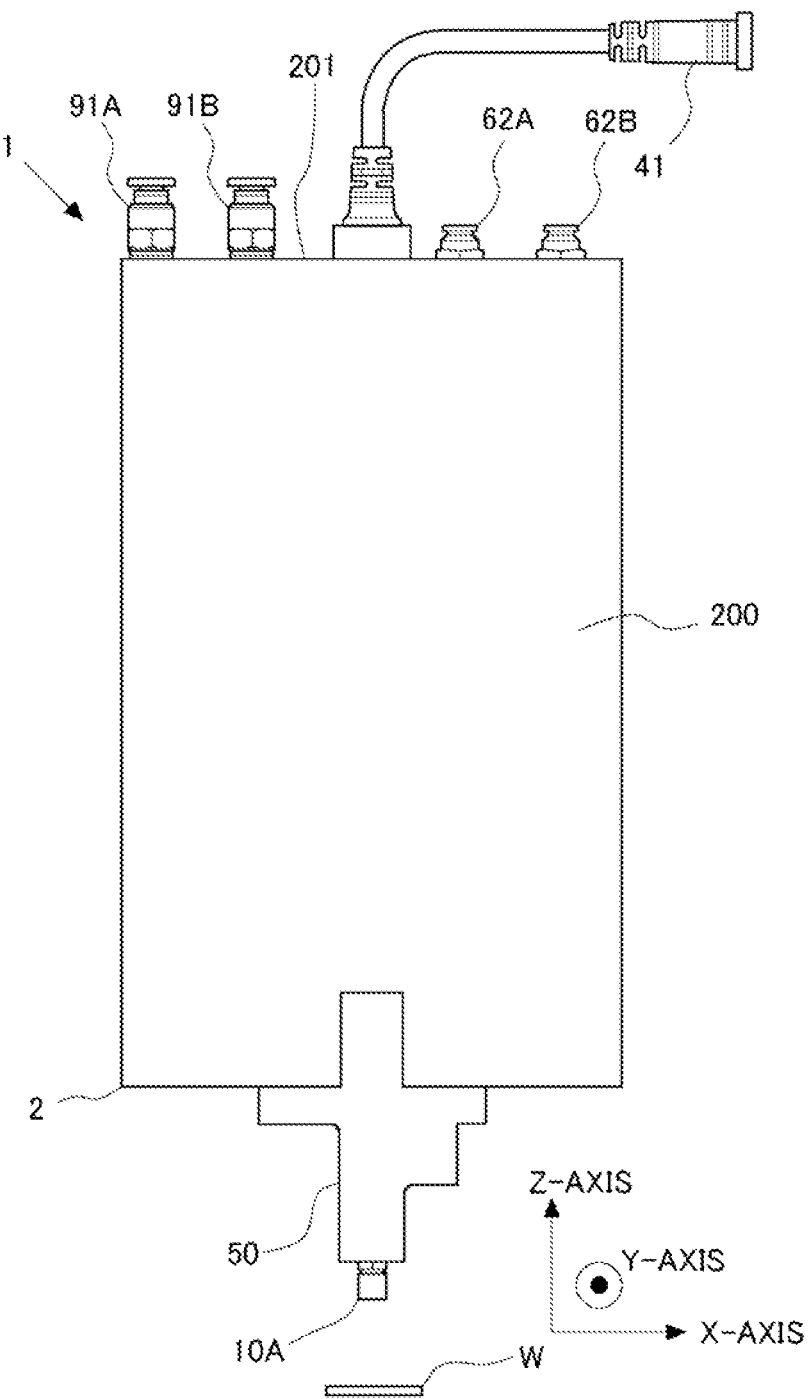

[Fig. 2]
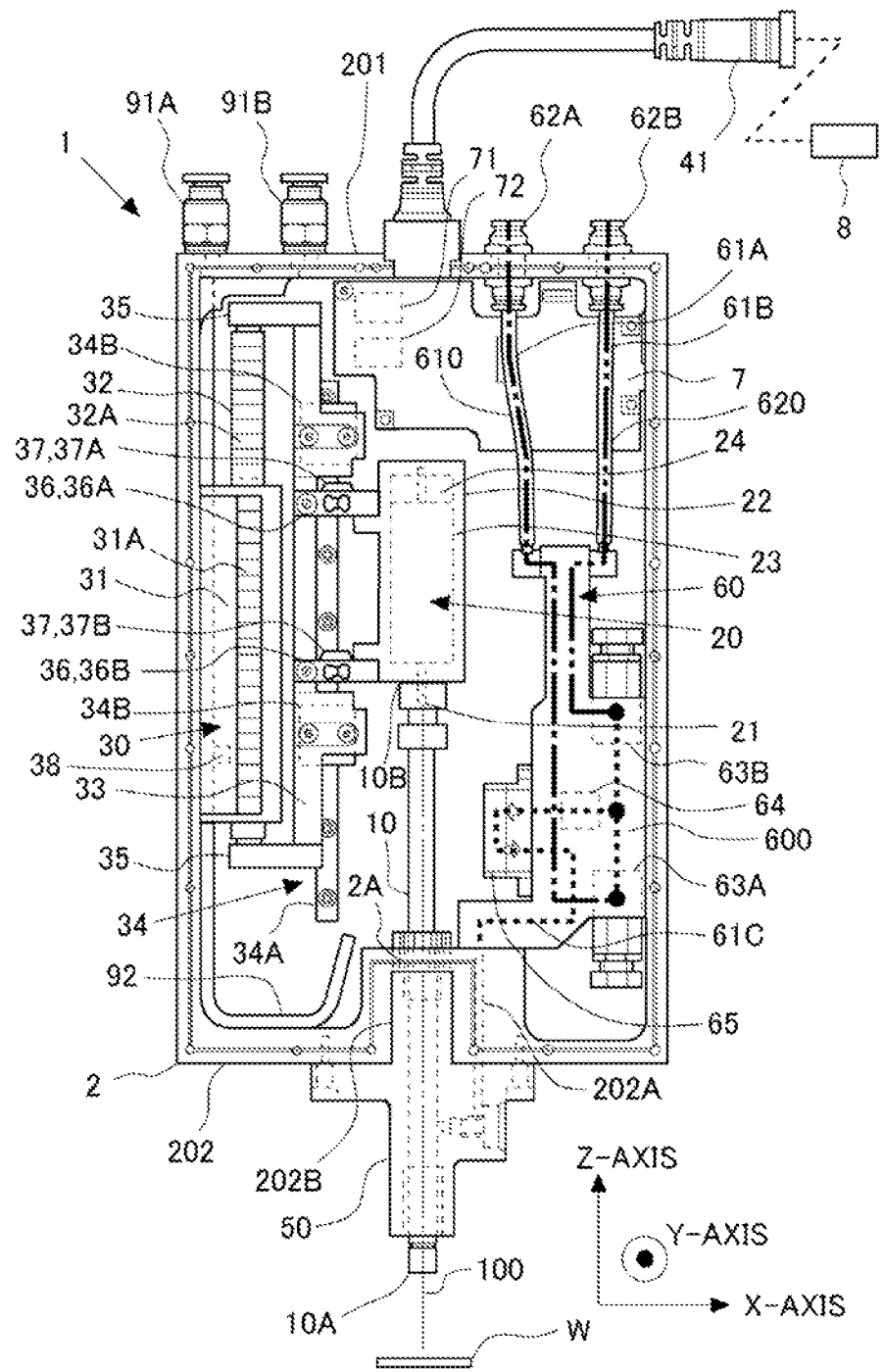

[Fig. 3]
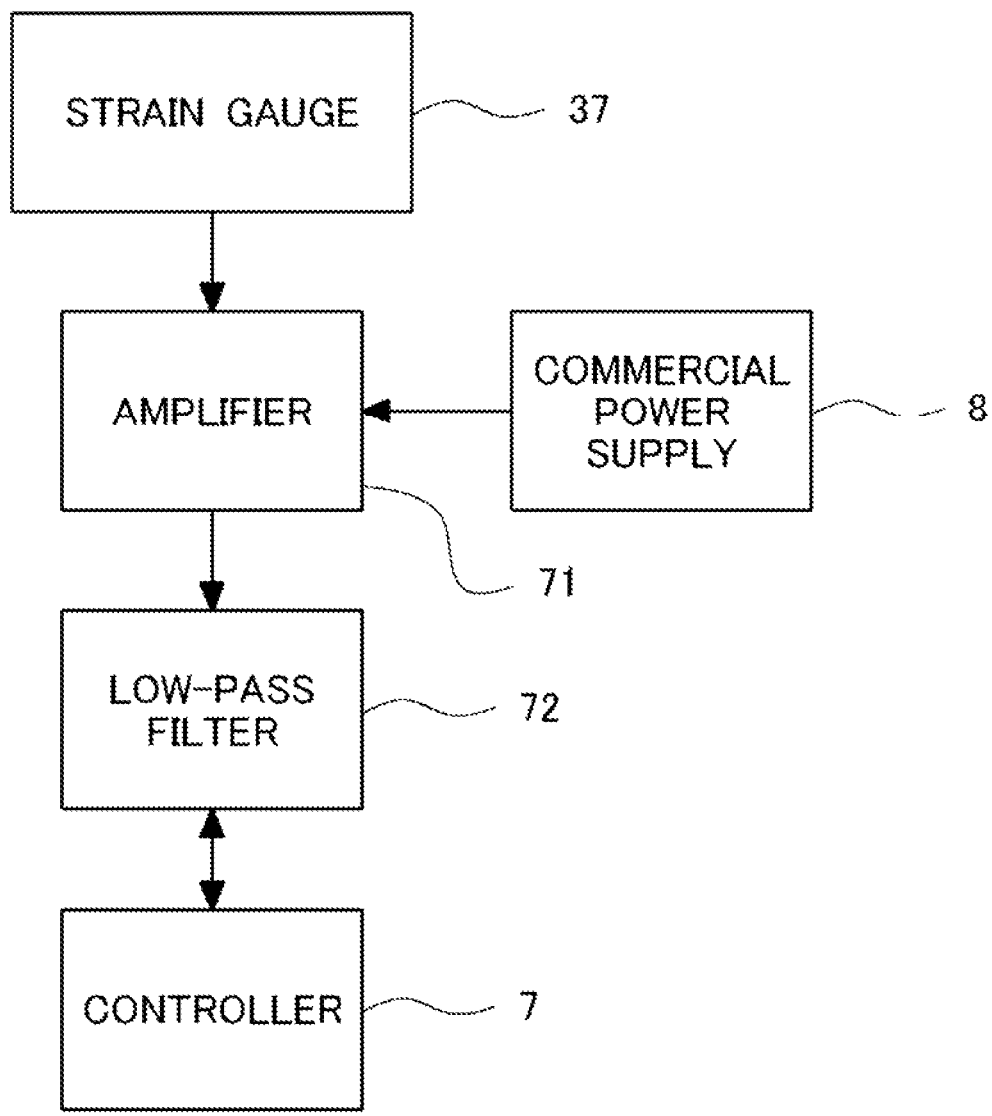

[Fig. 4]
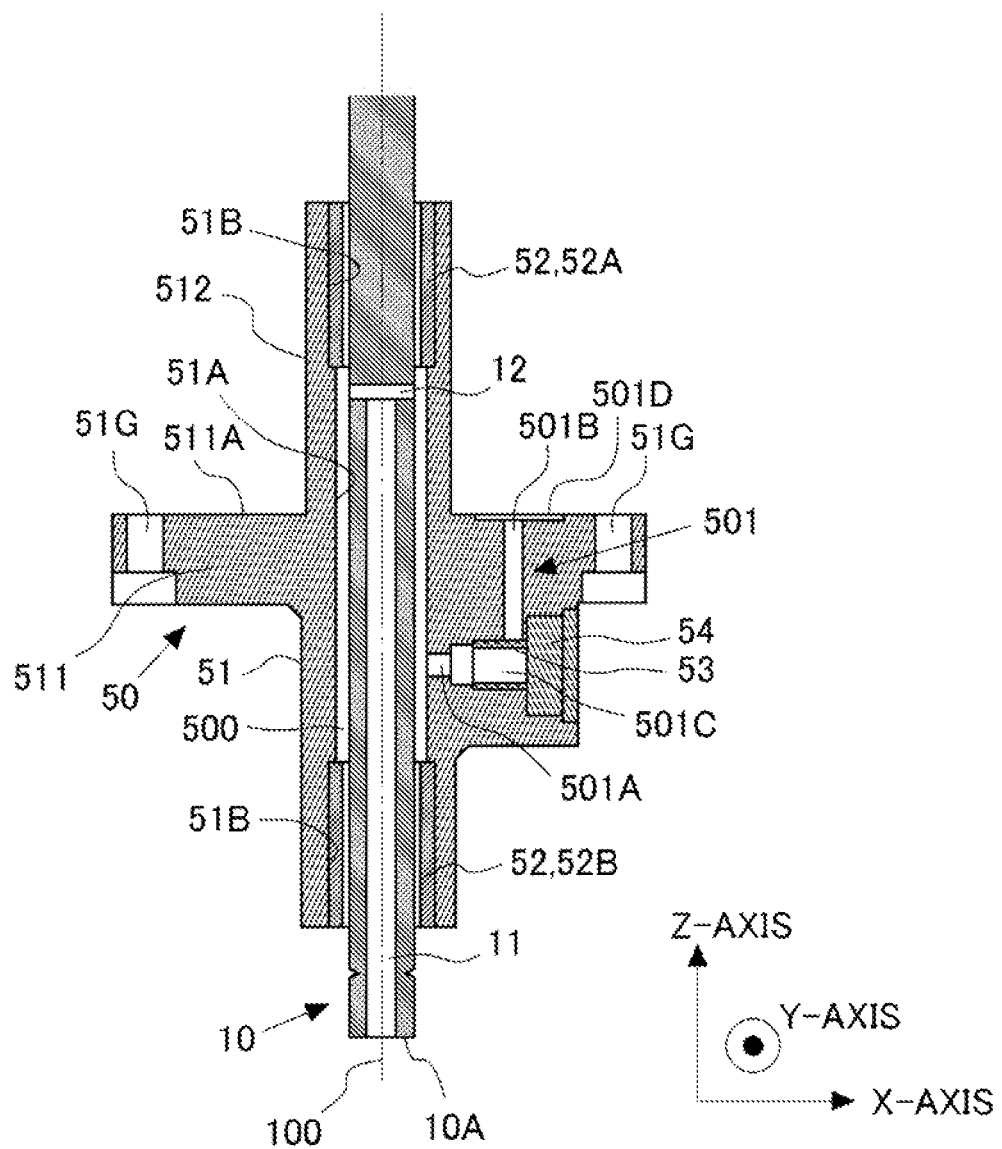

[Fig. 5]
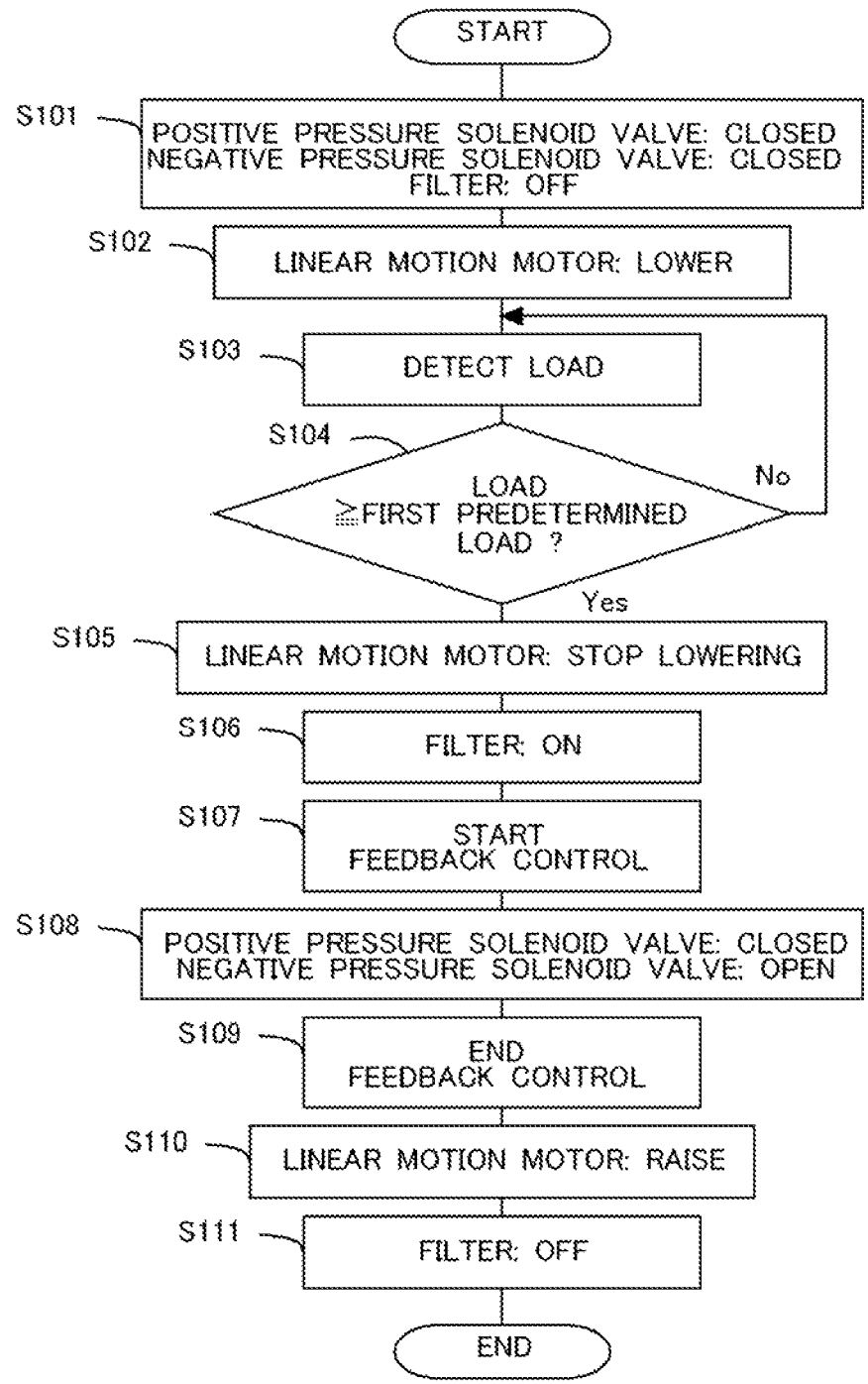

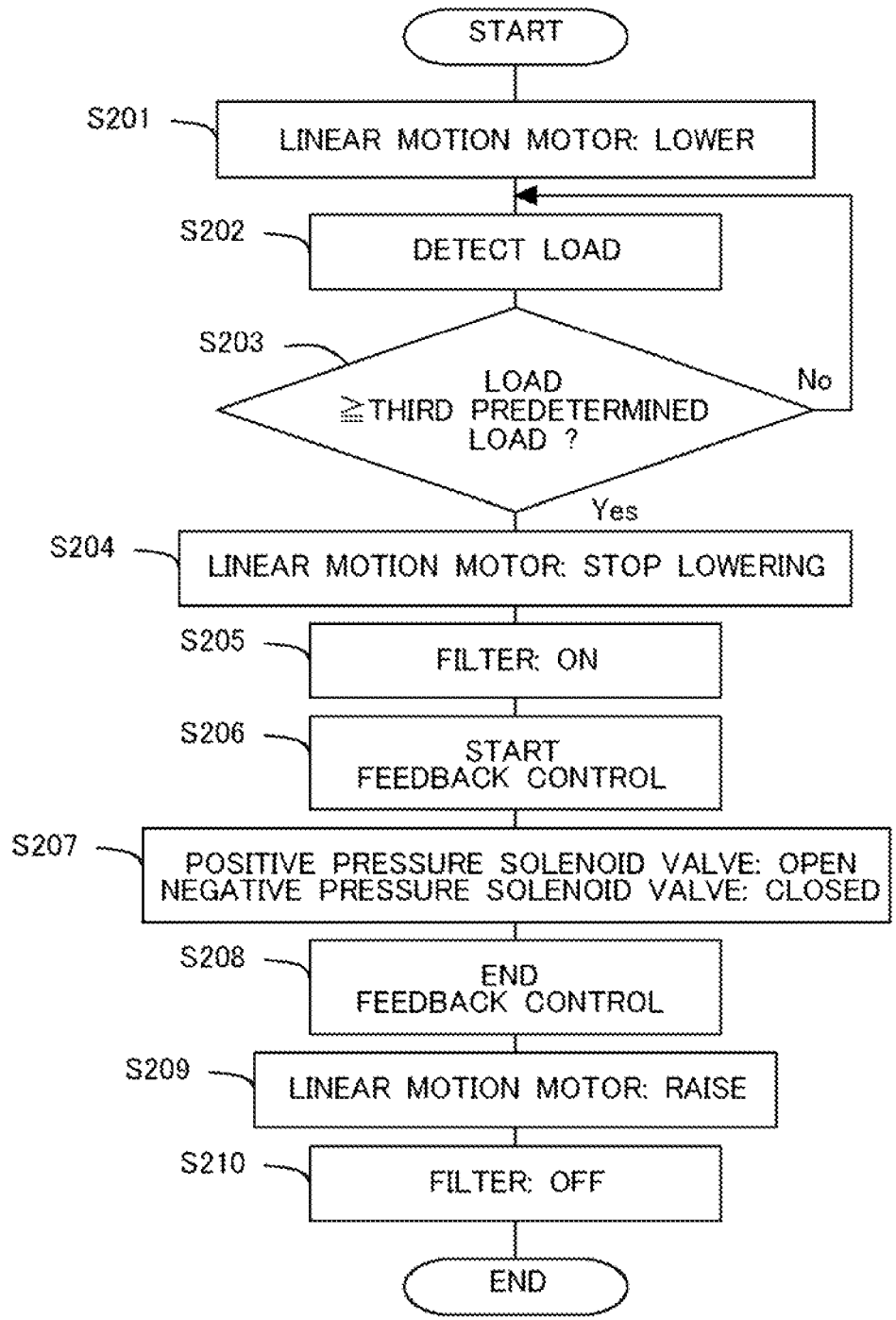
[Fig. 6]

[Fig. 7]
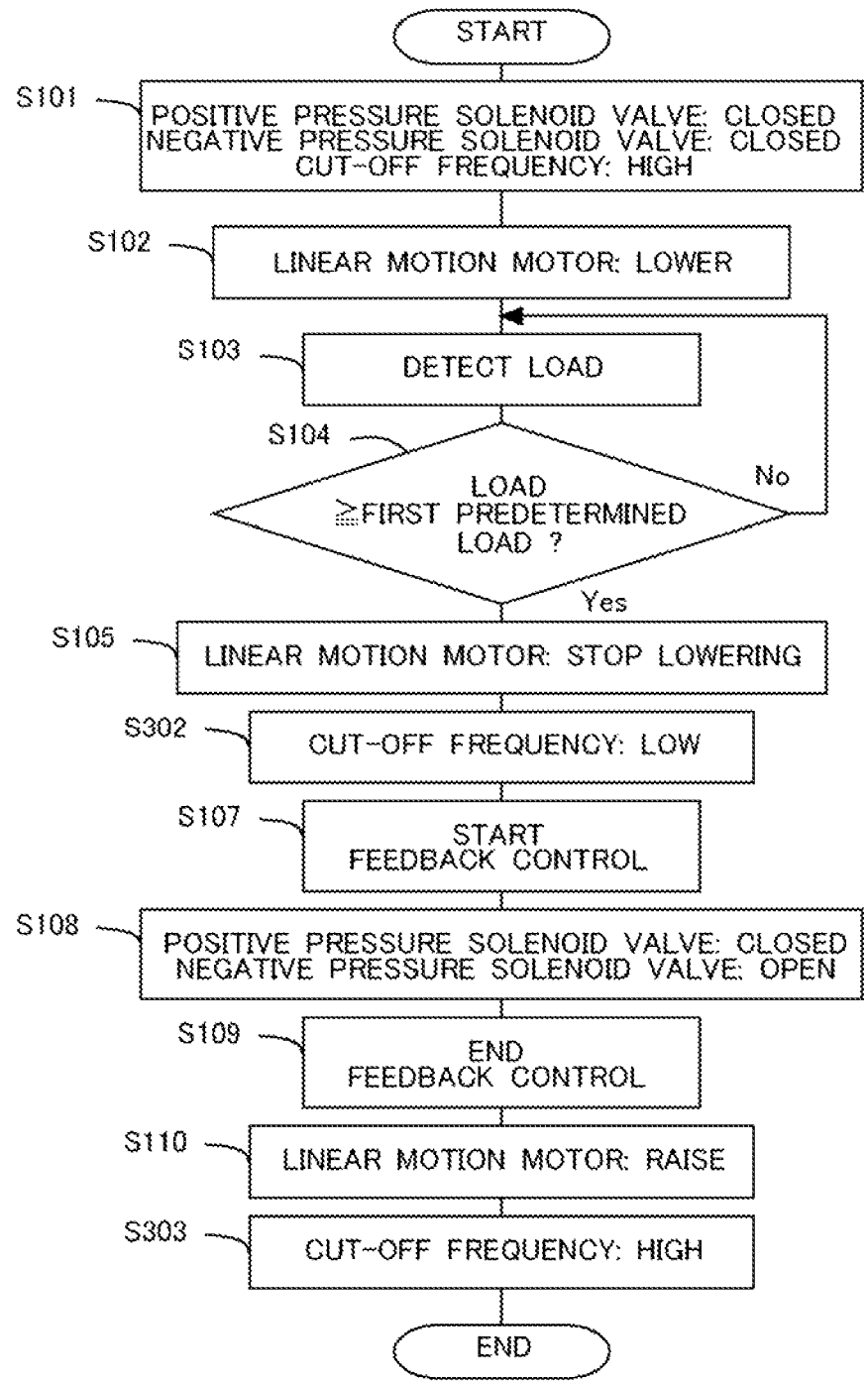

[Fig. 8]
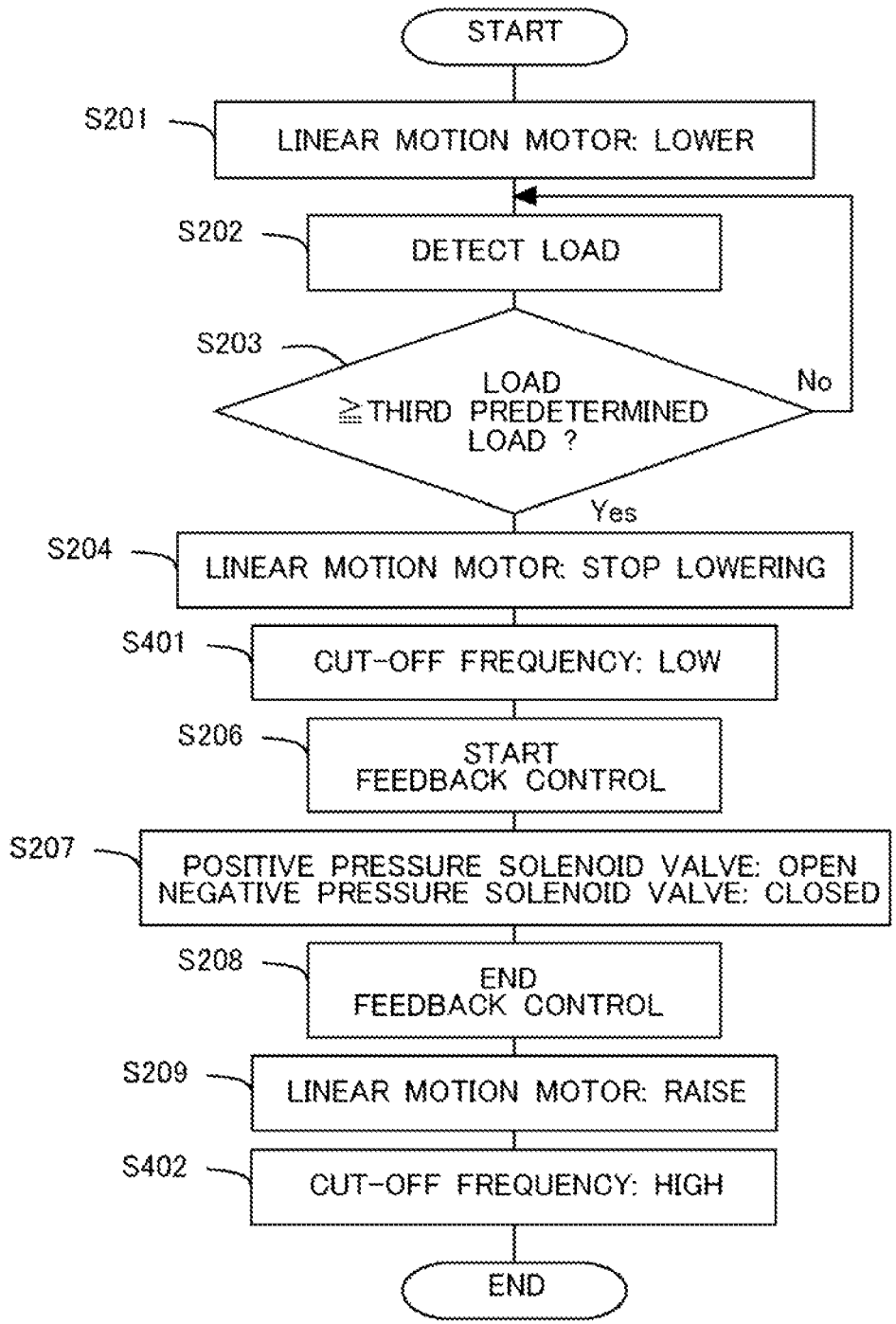

ACTUATOR

TECHNICAL FIELD

The present invention relates to an actuator.

BACKGROUND ART

A workpiece can be sucked to a hollow shaft and picked up by providing a negative pressure to an interior of the shaft while the shaft is pressed against the workpiece. Here, if there is a space between the workpiece and the shaft when the workpiece is sucked to the shaft, the workpiece might strongly collide with the shaft and be damaged, or the workpiece could not be sucked. On the other hand, if a force to press the workpiece is excessively large, the workpiece might be damaged. Therefore, it is desirable to press the shaft against the workpiece with an appropriate load. Furthermore, if a speed of the shaft is high when the shaft comes in contact with the workpiece, the workpiece might be damaged due to an impact caused by collision of the shaft with the workpiece, and thus, it is desirable to reduce this impact. Heretofore, a chuck member has been provided to a tip of a shaft body via a cushioning member such as a spring (e.g., see Patent Document 1). Specifically, the spring contracts to reduce the impact, when the chuck member comes in contact with the workpiece. Afterward, when the shaft further moves toward the workpiece, the workpiece is pressed with a load corresponding to a spring constant.

CITATION LIST

Patent Literature

[Patent Literature 1] Japanese Patent Laid-Open No. 2009-164347

SUMMARY OF INVENTION

Technical Problem

An appropriate load to be applied to a workpiece may vary depending on the type of the workpiece, but in a case where a cushioning member as described above is provided, the load applied to the workpiece is determined in accordance with a spring constant, and it is therefore difficult to change the load applied to the workpiece in accordance with the workpiece. Here, it is conceivable to detect a load that is applied to the shaft and the workpiece by rising a force sensor, and to control a motor driving the shaft, based on a detected value. An output from the force sensor is very small, and thus, the output from the force sensor is amplified by an amplifier. However, an output from the amplifier is easily affected by noise from a commercial power supply. It is conceivable to use a filter to reduce the effect of the noise, but when the output from the amplifier is processed by a filter, a phase delay is caused. That is, when a load that is applied to the workpiece and the shaft is detected based on the output from the filter, the detected value changes after an actual change in the load. If a phase delay is caused in the output from the filter when the shaft is moving toward the workpiece at a high speed, a timing of stopping the shaft may be delayed, and an unnecessarily large load is possibly applied to the workpiece.

An object of the present invention, which has been made in view of various actual situations described above, is to prevent, in relation to an actuator, application of an unnecessarily large load to a shaft and a workpiece.

Solution to Problem

One of aspects of the present invention is an actuator including: a shaft; a linear motion motor including a stator and a mover, wherein movement of the mover in parallel with a central axis of the shaft relative to the stator of the linear motion motor causes the shaft to move in a direction of the central axis; a connecting member that is at least a part of a member connecting the mover of the linear motion motor and the shaft; a force sensor provided in the connecting member, an output of the force sensor being according to a force applied to the connecting member; an amplifier that amplifies the output of the force sensor; a low-pass filter that reduces components of frequencies higher than a cut-off frequency, among components of frequencies included in an output from the amplifier; and a control device that detects a load applied to the shaft, based on the output from the amplifier, until the shaft or a member associated with the shaft comes in contact with an other member, and that detects the load applied to the shaft, based on an output from the low-pass filter, after the shaft or the member associated with the shaft comes in contact with the other member.

Moreover, one of aspects of the present invention is an actuator including: a shaft; a linear motion motor including a stator and a mover, wherein movement of the mover in parallel with a central axis of the shaft relative to the stator of the linear motion motor causes the shaft to move in a direction of the central axis; a connecting member that is at least a part of a member connecting the mover of the linear motion motor and the shaft; a force sensor provided in the connecting member, an output of the force sensor being according to a force applied to the connecting member; an amplifier that amplifies the output of the force sensor; a low-pass filter that reduces components of frequencies higher than a cut-off frequency, among components of frequencies included in an output from the amplifier; and a control device that detects a load applied to the shaft, based on an output from the low-pass filter, wherein the cut-off frequency is made higher until the shaft or a member associated with the shaft comes in contact with an other member than after the contact.

Advantageous Effects of Invention

According to the present invention, application of an unnecessarily large load to a shaft and a workpiece may be prevented in relation to an actuator.

BRIEF DESCRIPTION OF DRAWINGS

FIG. 1 is an appearance view of an actuator according to an embodiment.

FIG. 2 is a schematic configuration view illustrating an inner structure of the actuator according to the embodiment.

FIG. 3 is a block diagram illustrating a relationship between a strain gauge and a controller according to the embodiment.

FIG. 4 is a cross-sectional view illustrating a schematic configuration including a shaft housing and a tip of a shaft according to the embodiment.

FIG. 5 is a flowchart illustrating flow of pickup processing according to a first embodiment.

FIG. 6 is a flowchart illustrating flow of place processing according to the first embodiment.

FIG. 7 is a flowchart illustrating flow of pickup processing according to a second embodiment.

FIG. 8 is a flowchart illustrating flow of place processing according to the second embodiment.

MODE FOR CARRYING OUT THE INVENTION

In an actuator according to one of aspects of the present invention, a shaft is moved in a moving direction of a mover by a linear motion motor. The moving direction of the mover of the linear motion motor is parallel to a central axis direction of the shaft, and the linear motion motor is therefore driven to move the shaft in the central axis direction. An example of the linear motion motor is a linear motor. A connecting member is a member connecting the mover and the shaft, and may include a plurality of members. Furthermore, the mover of the linear motion motor may be integrated with the connecting member. The shaft may be rotatably supported.

During pickup or placing of a workpiece, when the shaft or a member associated with the shaft comes in contact with another member by driving of the linear motion motor, a load is applied to the shaft. That is, a force in a direction to lower the shaft acts on one end side (a linear motion motor side) of the connecting member, and a force in a direction to raise the shaft acts on the other end side (a shaft side) of the connecting member, thereby applying a force to the connecting member. This force has correlation with a load generated between the shaft and the workpiece. Therefore, detection of this force by a force sensor allows detection of the load applied to the shaft and the workpiece. The force sensor may be a sensor that uses a strain gauge, or may be a piezoelectric sensor, for example. Strain is generated in the connecting member due to application of force to the connecting member, for example. This strain has correlation with the load generated between the shaft and the workpiece. Therefore, detection of this strain by a strain gauge allows detection of the load applied to the shaft and the workpiece. Based on the load detected in this manner, the linear motion motor is controlled, so that an appropriate load can be applied to the workpiece at the time of pickup or placing. Additionally, a member associated with the shaft is an adapter provided at a tip of the shaft or a workpiece sucked to the shaft, for example. Furthermore, the ether member is a workpiece in regard to the shaft, and is a member where a workpiece is disposed in regard to the workpiece, for example.

When an amplifier is used to amplify the output of the force sensor, the output of the force sensor after amplification (an output from the amplifier) may include noise according to a frequency of a commercial power supply supplying power to the amplifier. This noise may be reduced by a low-pass filter. However, when the output from the amplifier is processed by the low-pass filter, a phase delay is caused. That is, a change in an output from the low-pass filter is delayed relative to a change in the output from the amplifier. Here, when there is a phase delay in the output from the force sensor processed by the low-pass filter (that is, the output from the low-pass filter) while the shaft is being lowered by the linear motion motor, there may be a delay in stopping the shaft after the shaft comes in contact with a workpiece at the time of picking up the workpiece, and an unnecessarily large load is possibly applied to the workpiece, for example.

Accordingly, the load applied to the shaft is detected based on the output from the amplifier until the shaft or the member associated with the shaft comes in contact with the other member, and the load applied to the shaft is detected based on the output from the low-pass filter after the shaft or the member associated with the shaft comes in contact with the other member.

That is, the load applied to the shaft is detected using the output from the amplifier until the shaft or the member associated with the shaft comes in contact with the other member, without using the output from the low-pass filter. The load is thus detected using an output including no phase delay caused by the low-pass filter. Here, to shorten a tact time, a speed of the shaft is desirably high until the shaft or the member associated with the shaft comes in contact with the other member. At this time, if the load is detected based on the output from the low-pass filter, an unnecessarily large load is possibly applied to the workpiece due to a response delay. On the other hand, when the load applied to the shaft is detected based on the output from the amplifier until the shaft or the member associated with the shaft comes in contact with the other member, a load applied to the workpiece may be detected in a state where there is no phase delay. Accordingly, when the shaft or the member associated with the shaft comes in contact with the other member, such a state may be swiftly detected and the shaft may be stopped. The workpiece may thus be prevented from being damaged. At this time, noise according to the frequency of a commercial power supply is included in the output from the amplifier, but the effect of included noise is small because it suffices if contact between the shaft or the member associated with the shaft and the other member can be detected.

After the shaft or the member associated with the shaft comes in contact with the other member, the load applied to the shaft is detected based on the output from the low-pass filter, and the load may thereby be more accurately detected. At this time, the linear motion motor is controlled such that the load applied to the shaft is made constant, for example. In this case, a moving speed of the shaft does not have to be increased, and thus, even if there is a phase delay in the output from the low-pass filter, the effect is small. Accordingly, application of an unnecessarily large load to the workpiece may be prevented.

Furthermore, in an actuator according to one of aspects of the present invention, a load applied to the shaft is detected based on an output from the low-pass filter, wherein the cut-off frequency is made higher until the shaft or a member associated with the shaft comes in contact with an other member than after the contact. Accordingly, the load may be detected in a state where the phase delay is relatively small, until the shaft or the member associated with the shaft comes in contact with the other member. That is, contact of the shaft with the workpiece may be more swiftly detected. After the shaft or the member associated with the shaft comes in contact with the other member, the cut-off frequency is lowered to reduce the effect of the noise, and the load may be more accurately detected. At this time, the phase delay is increased but the effect is small because the moving speed of the shaft does not have to be increased. Accordingly, application of an unnecessarily large load to the workpiece may be prevented.

Furthermore, in a case where the load that is detected is equal to or larger than a threshold, the control device may determine that the shaft or the member associated with the shaft is in contact with the other member. Additionally, in a case where the load that is detected is equal to or larger than the threshold, the control device may stop the linear motion motor. The threshold is a load by which it can be determined that the shaft or the member associated with the shaft is in contact with the other member. For example, the threshold is set as a load that is larger than an upper limit of a range in which a detected value of the load is possibly increased due to effect of noise due to a frequency of a power supply. The threshold can be changed in accordance with a type of workpiece. By setting the threshold in such a manner, even when there is an effect of noise, for example, contact of the shaft or the member associated with the shaft with the other member may be swiftly detected.

Furthermore, after the shaft or the member associated with the shaft comes in contact with the other member, the control device nay perform feedback control of the linear motion motor to bring the load that is detected closer to a predetermined load. This feedback control is performed based on the output of the low-pass filter that includes a phase delay but that is little affected by noise. For example, the predetermined load is a load with which it is possible to more securely pick up the workpiece while inhibiting the damage on the workpiece during the pickup of the workpiece, or is a load that is necessary in relation to the workpiece while inhibiting the damage on the workpiece during the placing of the workpiece. The speed of the shaft does not have to be increased at this time, and thus, the effect of phase delay is small even when the load is detected using the output of the low-pass filter including a phase delay. Moreover, because the load applied to the workpiece and the shaft may be more accurately detected, an appropriate load may be applied to the shaft and the workpiece.

Moreover, the shaft may include a hollow part formed on a tip side of the shaft such that an interior of the shaft is hollow, the actuator may further include a supply part that supplies a negative pressure to the hollow part, and the control device may cause the negative pressure to be supplied from the supply part to the hollow part at a time of pickup, during execution of the feedback control. Thus, the appropriate load is applied to the workpiece and then the negative pressure is supplied to the hollow part. Consequently, the damage on the workpiece due to the collision of the workpiece with the shaft can be inhibited. Furthermore, a space can be inhibited from being generated between the workpiece and the shaft, by pressing the shaft against the workpiece. Consequently, it is possible to more securely pick up the workpiece.

Moreover, the shaft may include a hollow part formed on a tip side of the shaft such that an interior of the shaft is hollow, the actuator may further include a supply part that supplies an atmospheric pressure or a positive pressure to the hollow part, and the control device may cause the atmospheric pressure or the positive pressure to be supplied from the supply part to the hollow part at a time of placing, during execution of the feedback control. For example, in a case where the workpiece is to be bonded to the other member by use of adhesive, a load in accordance with characteristics of bonding has to be applied to the workpiece. At this time, supplying the atmospheric pressure or the positive pressure to the hollow part after the load applied to the workpiece reaches a predetermined load in accordance with the characteristics of bonding allows more secure bonding.

Moreover, the connecting member may include a first member and a second member that are provided in a shifted manner in the direction of the central axis of the shaft, and the force sensor may include a strain gauge provided on each of surfaces that are provided on the first member and second member, respectively, the surfaces facing in a same direction and being parallel to each other and orthogonal to the central axis of the shaft.

Here, the linear motion motor operates to generate heat. Furthermore, another device provided in the actuator may generate heat. Such heat may thermally expand the linear motion motor and the connecting member. In this case, even if any load is not applied from the workpiece to the shaft, strain may be generated in the first member and the second member. For example, if there is a difference in temperature between a member to which the first member and the second member are connected on one end side and a member to which the members are connected on the other end side, a difference may be made in expansion amount. Note that hereinafter, the member to which the first member and the second member are connected on the one end side will be illustrated as a member having a large thermal expansion amount (a high expansion member), and the member to which the members are connected on the other end side will be illustrated as a member having a small thermal expansion amount (a low expansion member). In a case where the first member and the second member are connected to the high expansion member and the low expansion member in this manner, a distance between the first member and the second member may be larger on a high expansion member side than on a low expansion member side. Furthermore, forces in opposite directions are applied to the first member and the second member, respectively, in a direction to separate the first member and the second member on the high expansion member side. Consequently, strain in a contracting direction is generated in one of the surfaces that are provided on the first, member and second member, respectively, face in the same direction and are parallel to each other and orthogonal to the central axis of the shaft, and strain in an expanding direction is generated on the other surface. In consequence, one of the strain gauge provided in the first member and the strain gauge provided in the second member has an output corresponding to the strain in the contracting direction, and the other strain gauge has an output corresponding to the strain in the expanding direction. At this time, the forces having the same magnitude are applied to the first member and the second member in the opposite directions, respectively, and hence the output of the one strain gauge and the output of the other strain gauge are different in positive or negative sign and have about the same absolute amount. Thus, the outputs of both the strain gauges are connected in parallel, so that influences of thermal expansion cancel each other. Consequently, it is not necessary to separately perform correction in accordance with a temperature. That is, the load applied only to the shaft and workpiece can be simply and accurately detected.

Hereinafter, modes for carrying out the present invention will be described with reference to the drawings. However, a dimension, material, shape, relative arrangement and the like of a component described in this embodiment do not restrict the scope of the invention unless otherwise described. Furthermore, the following embodiments can be combined as much as possible.

First Embodiment

FIG. 1 is an appearance view of an actuator 1 according to the present embodiment. The actuator 1 includes a housing 2 having a substantially rectangular parallelepiped outer shape, and a lid 200 is attached to the housing 2. FIG. 2 is a schematic configuration view illustrating an inner structure of the actuator 1 according to the present embodiment. A part of a shaft 10 is housed within the housing 2. The shaft 10 is formed to be hollow on a tip 10A side. In a material of the shaft 10 and the housing 2, for example, a metal (e.g., aluminum) may be used, or a resin or the like may be used. Note that in the following description, an XYZ orthogonal coordinate system will be set, and positions of respective members will be described with reference to this XYZ orthogonal coordinate system. A long side direction of the largest surface of the housing 2, i.e., a direction of a central axis 100 of the shaft 10 is a Z-axis direction, a short side direction of the largest surface of the housing 2 is an X-axis direction, and a direction that is orthogonal to the largest surface of the housing 2 is a Y-axis direction. The Z-axis direction is also a perpendicular direction. Note that hereinafter, an upper side in the Z-axis direction in FIG. 2 is an upper side of the actuator 1, and a lower side in the Z-axis direction in FIG. 2 is a lower side of the actuator 1. Furthermore, a right side in the X-axis direction in FIG. 2 is a right side of the actuator 1, and a left side in the X-axis direction in FIG. 2 is a left side of the actuator 1. Additionally, a front side in the Y-axis direction in FIG. 2 is a front side of the actuator 1, and a back side in the Y-axis direction in FIG. 2 is a back side of the actuator 1. The housing 2 is formed such that a dimension in the Z-axis direction is larger than a dimension in the X-axis direction, and a dimension in the X-axis direction is larger than a dimension in the Y-axis direction. In the housing 2, a region corresponding to one surface (a front surface in FIG. 2) orthogonal to the Y-axis direction is open, and this opening is closed with the lid 200. The lid 200 is fixed to the housing 2 with, for example, screws.

The housing 2 houses therein a rotating motor 20 that rotates the shaft 10 about the central axis 100, a linear motion motor 30 that moves the shaft 10 relatively straight in a direction along the central axis 100 (i.e., the 2-axis direction) relative to the housing 2, and an air control mechanism 60. Furthermore, a shaft housing 50 into which the shaft 10 is inserted is attached to a lower end face 202 of the housing 2 in the Z-axis direction. In the housing 2, a recess 202B is formed to be recessed from the lower end face 202 toward an interior of the housing 2, and a part of the shaft housing 50 is inserted into the recess 202B, A through hole 2A in the Z-axis direction is formed in an upper end of the recess 202B in the Z-axis direction, and the shaft 10 is inserted into the through hole 2A and the shaft housing 50. The tip 10A of the shaft 10 on the lower side in the Z-axis direction protrudes outward from the shaft housing 50. The shaft 10 is provided at a center of the housing 2 in the X-axis direction and a center of the housing in the Y-axis direction. That is, the shaft 10 is provided such that a central axis extending in the Z-axis direction through the center of the housing 2 in the X-axis direction and the center of the housing in the Y-axis direction is superimposed on the central axis 100 of the shaft 10. The shaft 10 is moved straight in the Z-axis direction by the linear motion motor 30, and is rotated about the central axis 100 by the rotating motor 20.

A base end 10B side of the shaft 10 that is an end on a side opposite to the tip 10A (an upper end in the Z-axis direction) is housed in the housing 2, and connected to an output shaft 21 of the rotating motor 20. The rotating motor 20 rotatably supports the shaft 10. A central axis of the output shaft 21 of the rotating motor 20 coincides with the central axis 100 of the shaft 10. The rotating motor 20 includes, in addition to the output shaft 21, a stator 22, a rotor 23 that rotates in the stator 22, and a rotary encoder 24 that detects a rotation angle of the output shaft 21. The rotor 23 rotates relative to the stator 22, and the output shaft 21 and the shaft 10 also rotate in conjunction with the stator 22.

The linear motion motor 30 includes a stator 31 fixed to the housing 2, and a mover 32 that relatively moves in the 2-axis direction relative to the stator 31. The linear motion motor 30 is, for example, a linear motor. The stator 31 is provided with a plurality of coils 31A, and the mover 32 is provided with a plurality of permanent magnets 32A. The coils 31A are arranged at a predetermined pitch in the Z-axis direction, and a plurality of sets of three coils 31A of U, V, and W-phases are provided. In the present embodiment, a three-phase armature current is applied to the coils 31A of the U, V, and W-phases to generate a straight moving magnetic field, and the mover 32 is straight moved relative to the stator 31. The linear motion motor 30 is provided with a linear encoder 38 that detects a relative position of the mover 32 to the stator 31. Note that in place of the above configuration, the stator 31 may be provided with a permanent magnet, and the mover 32 may be provided with a plurality of coils.

The mover 32 of the linear motion motor 30 is coupled to the stator 22 of the rotating motor 20 via a linear motion table 33. The linear motion table 33 is movable with movement of the mover 32 of the linear motion motor 30. The movement of the linear motion table 33 is guided in the Z-axis direction by a linear motion guide device 34. The linear motion guide device 34 includes a rail 34A fixed to the housing 2, and a slider block 34B attached to the rail 34A. The rail 34A is configured to extend in the Z-axis direction, and the slider block 34B is configured to be movable along the rail 34A in the Z-axis direction.

The linear motion table 33 is fixed to the slider block 34B, and is movable together with the slider block 34B in the Z-axis direction. The linear motion table 33 is coupled to the mover 32 of the linear motion motor 30 via two coupling arms 35. The two coupling arras 35 couple opposite ends of the mover 32 in the Z-axis direction to opposite ends of the linear motion table 33 in the Z-axis direction. Furthermore, the linear motion table 33 is coupled, on a central side of the opposite ends, to the stator 22 of the rotating motor 20 via two coupling arms 36. Note that the coupling arm 36 on the upper side in the Z-axis direction will be referred to as a first arm 36A, and the coupling arm 36 on the lower side in the Z-axis direction will be referred to as a second arm 36B. Furthermore, the first arm 36A and the second arm 36B will be referred to simply as the coupling arms 36 when the arms are not distinguished. For the stator 22 of the rotating motor 20, since the linear motion table 33 is coupled to the stator 22 of the rotating motor 20 via the coupling arms 36, the stator 22 of the rotating motor 20 also moves with the movement of the linear motion table 33. The coupling arm 36 has a quadrangular cross section, A strain gauge 37 is fixed to a surface of each coupling arm 36 which faces upward in the Z-axis direction. Note that the strain gauge 37 fixed to the first arm 36A will be referred to as a first strain gauge 37A, and the strain gauge 37 fixed to the second arm 36B will be referred to as a second strain gauge 37B. The first strain gauge 37A and the second strain gauge 37B will be referred to simply as the strain gauges 37 when the gauges are not distinguished. Note that two strain gauges 37 of the present embodiment are provided on surfaces of the coupling arms 36 which face upward in the Z-axis direction, respectively. In place of the surfaces, the gauges may be provided on surfaces of the coupling arm 36 that face downward in the Z-axis direction. The strain gauge 37 is an example of the force sensor.

The air control mechanism 60 is a mechanism to generate a positive pressure or a negative pressure at the tip 10A of the shaft 10. That is, the air control mechanism 60 sucks air in the shaft 10 during pickup of a workpiece W, to generate the negative pressure at the tip 10A of the shaft 10. Consequently, the workpiece W is sucked to the tip 10A of the shaft 10. Furthermore, air is supplied into the shaft 10, to generate the positive pressure at the tip 10A of the shaft 10. Thus, the workpiece W is easily removed from the tip 10A of the shaft 10.

The air control mechanism 60 includes a positive pressure passage 61A (see a dashed chain line) through which positive pressure air flows, a negative pressure passage 61B (see a double-dashed chain line) through which negative pressure air flows, and a shared passage 61C (see a broken line) shared by the positive pressure air and the negative pressure air. The positive pressure passage 61A has one end connected to a positive pressure connector 62A provided on an upper end face 201 of the housing 2 in the Z-axis direction, and the positive pressure passage 61A has the other end connected to a solenoid valve for positive pressure (hereinafter, referred to as a positive pressure solenoid valve 63A). The positive pressure solenoid valve 63A is opened and closed by an after-mentioned controller 7. Note that the positive pressure passage 61A has one end portion constituted of a tube 610, and the other end portion constituted of a hole made in a block 600. The positive pressure connector 62A extends through the upper end face 201 of the housing 2 in the Z-axis direction, and the positive pressure connector 62A is connected to an external tube linked to an air discharging pump or the like.

The negative pressure passage 61B has one end connected to a negative pressure connector 62B provided on the upper end face 201 of the housing 2 in the Z-axis direction, and the negative pressure passage 61B has the other end connected to a solenoid valve for negative pressure (hereinafter, referred to as a negative pressure solenoid valve 63B). The negative pressure solenoid valve 63B is opened and closed by the after-mentioned controller 7. Note that the negative pressure passage 61B has one end portion constituted of a tube 620, and the other end portion constituted of a hole made in the block 600. The negative pressure connector 62B extends through the upper end face 201 of the housing 2 in the Z-axis direction and the negative pressure connector 62B is connected to an external tube linked to an air sucking pump or the like.

The shared passage 61C is constituted of a hole made in the block 600. The shared passage 61C has one end branching into two to be connected to the positive pressure solenoid valve 63A and the negative pressure solenoid valve 63B, and the shared passage 61C has the other end connected to an air flow passage 202A that is a through hole formed in the housing 2. The air flow passage 202A communicates with the shaft housing 50. The negative pressure solenoid valve 63B is opened and the positive pressure solenoid valve 63A is closed, to communicate between the negative pressure passage 61B and the shared passage 61C, thereby generating the negative pressure in the shared passage 61C. Then, air is sucked from the shaft housing 50 through the air flow passage 202A. On the other hand, the positive pressure solenoid valve 63A is opened and the negative pressure solenoid valve 63B is closed, to communicate between the positive pressure passage 61A and the shared passage 61C, thereby generating the positive pressure in the shared passage 61C. Then, air is supplied into the shaft housing 50 through the air flow passage 202A. The shared passage 61C is provided with a pressure sensor 64 that detects a pressure of air in the shared passage 61C and a flow sensor 65 that detects a flow rate of air in the shared passage 61C.

Note that in the actuator 1 illustrated in FIG. 2, the positive pressure passage 61A and the negative pressure passage 61B have a part constituted of a tube, and the other part constituted of a hole made in the block 600. The present invention is not limited to this embodiment, and all the passages may be constituted of tubes, or ail the passages nay be constituted of holes made in the block 600. This also applies to the shared passage 61C, and the passage may be entirely constituted of a tube, or may be constituted by combined use of the tube. Note that a material of the tube 610 and the tube 620 may be a material such as a resin having flexibility, or may be a material such as a metal that does not have any flexibility. Furthermore, an atmospheric pressure may be supplied, instead of supplying the positive pressure to the shaft housing 50 by use of the positive pressure passage 61A.

Additionally, on the upper end face 201 of the housing 2 in the Z-axis direction, provided are a connector (hereinafter, referred to as an inlet connector 91A) that is an inlet of air for cooling the rotating motor 20 and a connector (hereinafter, referred to as an outlet connector 91B) that is an outlet of air from the housing 2. The inlet connector 31A and the outlet connector 91B extend through the upper end face 201 of the housing 2 so that air can flow through. A tube linked to an air discharge pump or the like is connected to the inlet connector 91A from outside the housing 2, and a tube that discharges air flowing out of the housing 2 is connected to the outlet connector 91B from outside the housing 2. The interior of the housing 2 is provided with a metal pipe (hereinafter, referred to as a cooling pipe 92) through which air for cooling the rotating motor 20 flows, and the cooling pipe 92 has one end connected to the inlet connector 91A. The cooling pipe 92 is formed to extend from the inlet connector 91A in the Z-axis direction to a vicinity of the lower end face 202 of the housing 2, and to curve in the vicinity of the lower end face 202 such that the pipe, at the other end, faces the rotating motor 20. Thus, air is supplied from the lower side in the Z-axis direction into the housing 2, thereby allowing efficient cooling. Furthermore, the cooling pipe 92 extends through the stator 31, to take heat from the coils 31A of the linear motion motor 30. The coils 31A are arranged around the cooling pipe 92, to take more heat from the coils 31A provided in the stator 31.

The upper end face 201 of the housing 2 in the Z-axis direction is connected to a connector 41 including a power supplying wire and a signal line. Furthermore, the housing 2 is provided with the controller 7. The wire or signal line pulled from the connector 41 into the housing 2 is connected to the controller 7, The controller 7 is provided with a central processing unit (CPU), a random access memory (RAM), a read only memory (ROM), and an erasable programmable ROM (EPROM), which are connected to one another via a bus. In the EPROM, various programs, various tables and others are stored. The program stored in the EPROM is loaded and executed in a work area of the RAM by the CPU, and through the execution of this program, the rotating motor 20, the linear motion motor 30, the positive pressure solenoid valve 63A, the negative pressure solenoid valve 63B and others are controlled. Thus, the CPU achieves a function that meets a predetermined purpose. Furthermore, output signals of the pressure sensor 64, the flow sensor 65, the strain gauge 37, the rotary encoder 24 and the linear encoder 38 are input into the controller 7. Note that the controller 7 does not have to entirely control the rotating motor 20, the linear motion motor 30, the positive pressure solenoid valve 63A, the negative pressure solenoid valve 63B and others, and another control equipment connected to the connector 41 may control some of these components. Alternatively, the program may be supplied from external control equipment to the controller 7 via the connector 41.

An amplifier 71 that amplifies an output of the strain gauge 37, and a low-pass filter 72 that reduces noise in an output of the amplifier 71 are provided inside the housing 2. The amplifier 71 receives supply of power from a commercial power supply 8 that is connected via the connector 41. FIG. 3 is a block diagram illustrating a relationship between the strain gauge 37 and the controller 7. The output signal of the strain gauge 37 is input to the amplifier 71. At the amplifier 71, the output signal of the strain gauge 37 is amplified using the power from the commercial power supply 3. An output signal from the amplifier 71 is input to the low-pass filter 72. The low-pass filter 72 reduces noise caused by the commercial power supply 8. Here, because the amplifier 71 amplifies the output signal of the strain gauge by using the power from the commercial power supply 3, effect of a frequency of the commercial power supply 8 is easily received. That is, the output signal from the amplifier 71 includes noise according to the frequency of the commercial power supply 8. By causing the output signal from the amplifier 71 to pass through the low-pass filter 72, components of the noise may be reduced. Additionally, the low-pass filter 72 is controlled by the controller 7. The controller 7 can stop the function of the low-pass filter 72. In this case, the output signal from the amplifier 71 is input to the controller 7. The low-pass filter 72 reduces components of frequencies higher than a cut-off frequency. Accordingly, the cut-off frequency of the low-pass filter 72 is set such that the effect of the frequency of the commercial power supply 8 is reduced. In the following, the output from the amplifier 71 will be referred to as "AMP output", and the output from the low-pass filter 72 as "LPF output". Additionally, at least one of the amplifier 71 and the low-pass filter 72 may be provided outside the housing 2. In this case, the strain gauge 37 and the amplifier 71 may be connected via the connector 41, or the amplifier and the low-pass filter 72 may be connected via the connector 41, or the low-pass filter 72 and the controller 7 may be connected via the connector 41.

FIG. 4 is a cross-sectional view illustrating a schematic configuration including the shaft housing 50 and the tip 10A of the shaft 10. The shaft housing 50 includes a housing body 51, two rings 52, a filter 53, and a filter stop 54. In the housing body 51, a through hole 51A is formed into which the shaft 10 is inserted. The through hole 51A extends through the housing body 51 in the Z-axis direction, and an upper end of the through hole 51A in the Z-axis direction communicates with the through hole 2A formed in the housing 2. A diameter of the through hole 51A is larger than an outer diameter of the shaft 10. Consequently, a space is provided between an inner surface of the through hole 51A and an outer surface of the shaft 10. In opposite ends of the through hole 51A, enlarged parts 51B each having a hole diameter enlarged are provided. The rings 52 are fitted in two enlarged parts 51B, respectively. Each ring 52 is formed in a cylindrical shape, and an inner diameter of the ring 52 is slightly larger than the outer diameter of the shaft 10. Therefore, the shaft 10 is movable in the Z-axis direction in the ring 52. Consequently, a space is also formed between an inner surface of the ring 52 and the outer surface of the shaft 10. Therefore, the shaft 10 is movable in the Z-axis direction in the ring 52, and the shaft 10 is rotatable about the central axis 100 in the ring 52. However, the space formed between the inner surface of the ring 52 and the outer surface of the shaft 10 is smaller than the space formed between the inner surface of the through hole 51A excluding the enlarged parts 51B and the outer surface of the shaft 10. Note that the ring 52 on the upper side in the Z-axis direction will be referred to as a first ring 52A, and the ring 52 on the lower side in the Z-axis direction will be referred to as a second ring 52B. The first ring 52A and the second ring 52B will be referred to simply as the rings 52 when the rings are not distinguished. In a material of the ring 52, for example, a metal or a resin may be used.

A protrusion 511 protruding in opposite right and left directions in the X-axis direction is formed in a central part of the housing body 51 in the Z-axis direction. In the protrusion 511, a mounting surface 511A is formed which is a surface parallel to the lower end face 202 of the housing 2, the surface coming in contact with the lower end face 202, when the shaft housing 50 is mounted to the lower end face 202 of the housing 2. The mounting surface 511A is a surface orthogonal to the central axis 100. Furthermore, a part 512 that is a part of the shaft housing 50 on the upper side of the mounting surface 511A in the Z-axis direction is formed to fit in the recess 202B formed in the housing 2, when the shaft housing 50 is mounted to the housing 2.

The space is provided between the inner surface of the through hole 51A and the outer surface of the shaft 10 as described above. As a result, in the housing body 51, an inner space 500 is formed which is a space surrounded with the inner surface of the through hole 51A, the outer surface of the shaft 10, a lower end face of the first ring 52A, and an upper end face of the second ring 52B. Furthermore, in the shaft housing 50, a control passage 501 is formed which communicates between an opening of the air flow passage 202A formed in the lower end face 202 of the housing 2 and the inner space 500 to form an air passage. The control passage 501 includes a first passage 501A extending in the X-axis direction, a second passage 501B extending in the Z-axis direction, and a filter part 501C that is a space where the first passage 501A and the second passage 501B are connected and the filter 53 is disposed. The first passage 501A has one end connected to the inner space 500, and the other end connected to the filter part 501C. The second passage 501B has one end opened in the mounting surface 511A and aligned to toe connected to the opening of the air flow passage 202A.

Furthermore, the second passage 501B has the other end connected to the filter part 501C. In the filter part 501C, the filter 53 formed in a cylindrical shape is provided. The filter part 501C is formed in a columnar space extending in the X-axis direction such that a central axis coincides with that of the first passage 501A. An inner diameter of the filter part 501C is substantially equal to an outer diameter of the filter 53. The filter 53 is inserted into the filter part 501C in the X-axis direction. After the filter 53 is inserted into the filter part 501C, an end of the filter part 501C which is an insertion port of the filter 53 is closed with the filter stop 54. The other end of the second passage 501B is connected to the filter part 501C from a side of an outer circumferential surface of the filter 53. Furthermore, the other end of the first passage 501A communicates with a central side of the filter 53. Therefore, air flowing through a space between the first passage 501A and the second passage 501B flows through the filter 53. Therefore, foreign matter is captured by the filter 53, even if the foreign matter is sucked together with air into the inner space 500, for example, when the negative pressure is generated at the tip 10A. In the one end of the second passage 501B, a groove 501D is formed to hold sealant.

In vicinities of opposite ends of the protrusion 511 in the X-axis direction, two bolt holes 51G are formed into which bolts are inserted, when the shaft housing 50 is fixed to the housing 2 by use of the bolts. The bolt holes 51G extend through the protrusion 511 in the Z-axis direction and opens in the mounting surface 511A.

A hollow part 11 is formed on the tip 10A side of the shaft 10 such that, the shaft 10 is hollow. The hollow part 11 has one end opened at the tip 10A. Furthermore, at the other end of the hollow part 11, a communication hole 12 that communicates between the inner space 500 and the hollow part 11 in the X-axis direction is formed. The communication hole 12 is formed to communicate between the inner space 500 and the hollow part 11, in an entire range of a stroke when the shaft 10 is moved in the Z-axis direction by the linear motion motor 30. Therefore, the tip 10A of the shaft 10 communicates with the air control mechanism 60 through the hollow part 11, the communication hole 12, the inner space 500, the control passage 501, and the air flow passage 202A. Note that the communication hole 12 may be formed in the Y-axis direction in addition to the X-axis direction.

According to this configuration, the communication hole 12 always communicates between the inner space 500 and the hollow part 11, even if the shaft 10 is at any position in the Z-axis direction when the linear motion motor 30 is driven to move the shaft 10 in the Z-axis direction. Furthermore, the communication hole 12 always communicates between the inner space 500 and the hollow part 11, even if a rotation angle of the shaft 10 is any angle about the central axis 100 when the rotating motor 20 is driven to rotate the shaft 10 about the central axis 100. Therefore, a communication state between the hollow part 11 and the inner space 500 is maintained even if the shaft 10 is in any state, and hence the hollow part 11 always communicates with the air control mechanism 60. For that reason, air in the hollow part 11 is sucked through the air flow passage 202A, the control passage 501, the inner space 500, and the communication hole 12, if the positive pressure solenoid valve 63A is closed and the negative pressure solenoid valve 63B is opened in the air control mechanism 60, regardless of the position of the shaft 10. As a result, the negative pressure can be generated in the hollow part 11. That is, the negative pressure can be generated at the tip 10A of the shaft 10, and hence the workpiece W can be sucked to the tip 10A of the shaft 10. Note that the space is also formed between the inner surface of the ring 52 and the outer surface of the shaft 10 as described above. However, this space is smaller than a space that forms the inner space 500 (i.e., the space formed between the inner surface of the through hole 51A and the outer surface of the shaft 10). Thus, in the air control mechanism 60, the positive pressure solenoid valve 63A is closed and the negative pressure solenoid valve 63B is opened, so that a flow rate of air flowing through the space between the inner surface of the ring 52 and the outer surface of the shaft 10 can be suppressed, even if air is sucked from the inner space 500. Consequently, the negative pressure at which the workpiece W can be picked up can be generated at the tip 10A of the shaft 10. On the other hand, the positive pressure can be generated in the hollow part 11, if the positive pressure solenoid valve 63A is opened and the negative pressure solenoid valve 63B is closed in the air control mechanism 60, regardless of the position of the shaft 10. That is, since the positive pressure can be generated at the tip 10A of the shaft 10, the workpiece W can be quickly removed from the tip 10A of the shaft 10.

(Pick and Place Operation)

Description will be mace as to pick and place of the workpiece W by use of actuator 1. The controller 7 executes a predetermined program to perform the pick and place. During the pickup of the workpiece W, the positive pressure solenoid valve 63A and the negative pressure solenoid valve 63B are both in a closed state, until the shaft 10 comes in contact with the workpiece W. In this case, the pressure of the tip 10A of the shaft 10 is the atmospheric pressure. Then, the linear motion motor 30 moves the shaft 10 downward in the Z-axis direction. Upon contact of the shaft 10 with the workpiece W, the linear motion motor 30 is stopped. Then, the negative pressure solenoid valve 63B is opened to generate the negative pressure at the tip 10A of the shaft 10 while performing feedback control on the load applied to the shaft 10, thereby sucking the workpiece W to the tip 10A of the shaft 10. Afterward, the linear motion motor 30 moves the shaft 10 upward in the Z-axis direction. At this time, the shaft 10 is rotated by the rotating motor 20 as required. Thus, the workpiece W can be picked up.

Next, during the placing of the workpiece W, the shaft 10 in a state where the workpiece W is sucked to the tip 10A is moved downward in the Z-axis direction by the linear motion motor 30. At this time, the positive pressure solenoid valve 63A is closed, and the negative pressure solenoid valve 63B is opened. Upon contact of the workpiece W with the other member, the linear motion motor 30 is stopped. Then, the negative pressure solenoid valve 63B is closed and the positive pressure solenoid valve 63A is opened to generate the positive pressure at the tip 10A of the shaft 10 while performing feedback control on the load applied to the shaft 10. Afterward, the linear motion motor 30 moves the shaft 10 upward in the Z-axis direction, and the tip 10A of the shaft 10 is thereby separated from the workpiece W. Thus, the workpiece W can be placed.

Here, at the time of pickup and placing of the workpiece W, a load is applied to the shaft 10 and the workpiece W. For example, at the time of picking up the workpiece W, the negative pressure is generated in the tip 10A in a state where the shaft 10 is pressed against the workpiece W, and the workpiece W may be more securely picked up, and also, the workpiece 73 may be inhibited from strongly colliding with the tip 10A and being damaged when the workpiece W is sucked. On the other hand, if the load applied to the workpiece W is too large at the time of pressing the shaft 10 against the workpiece W, the workpiece W is possibly damaged. Applying an appropriate load to the workpiece W by detecting the load applied to the workpiece W prevents the workpiece 73 from being damaged, and also, allows the workpiece W to be more securely picked up. Furthermore, also at the time of placing, an appropriate load is sometimes desired to be applied to the workpiece W. For example, in a case where the workpiece W is to be bonded to the other member by use of adhesive, a load in accordance with characteristics of bonding has to be applied. Also at this time, controlling the load applied to the workpiece W to be appropriate allows more secure bonding.

Moreover, at the time of pickup and placing of the workpiece W, the load applied to the workpiece W and the shaft 10 may be detected by using the strain gauge 37. For example, at the time of pickup of the workpiece W, when the shaft 10 comes in contact with the workpiece W, a load is generated between the shaft 10 and the workpiece W, and then, when the tip 10A of the shaft 10 further presses the workpiece W, the load applied to the shaft 10 and the workpiece W is increased. That is, the shaft 10 receives a force from the workpiece W due to reaction when the shaft 10 applies the force to the workpiece W. The force received from the workpiece W by the shaft 10 acts in a direction to generate strain relative to the coupling arm 36. That is, the strain is generated in the coupling arm 36 at this time. This strain is detected by the strain gauge 37. Then, the strain detected by the strain gauge 37 has correlation with the force received from the workpiece W by the shaft 10. Consequently, the force received from the workpiece W by the shaft 10, that is, the load generated between the shaft 10 and the workpiece W can be detected based on a detected value of the strain gauge 37. A relation between the detected value of the strain gauge 37 and the load can be obtained beforehand by experiment, simulation or the like. Also at the time of placing the workpiece W, the load applied to the workpiece W and the shaft 10 may be detected in the same manner based on the detected value of the strain gauge 37. Because the load generated between the shaft 10 and the workpiece W can be detected based on the detected value of the strain gauge 37 in the above manner, an appropriate load may be applied at the time of pickup and placing of the workpiece W.

Note that change in resistance of the strain gauge 37 due to the strain is extremely small, and hence the change is taken as change in voltage by use of a Wheatstone bridge circuit. In the actuator 1, an output of a bridge circuit associated with the first strain gauge 37A and an output of a bridge circuit associated with the second strain gauge 37B are connected in parallel. Thus, the outputs of both the bridge circuits are connected in parallel, and accordingly the change in voltage is obtained, from which influence of temperature is eliminated as follows.

Here, assuming that there is not any strain of the coupling arm 36 due to the influence of temperature, the loads detected by the first strain gauge 37A and the second strain gauge 37B, respectively, are about the same. However, for example, in a case where operation frequency of the linear motion motor 30 is high and operation frequency of the rotating motor 20 is low, a temperature on a linear motion motor 30 side is higher than a temperature on a rotating motor 20 side. Therefore, an expansion amount in the Z-axis direction of the linear motion table 33 is larger than an expansion amount in the Z-axis direction of the rotating motor 20, between the first arm 36A and the second arm 36B. Consequently, the first arm 36A is not parallel to the second arm 36B, and a distance between the first arm 36A and the second arm 36B is larger on the linear motion motor 30 side than on the rotating motor 20 side. At this time, the first strain gauge 37A contracts, and the second strain gauge 37B expands. In this case, the output of the first strain gauge 37A apparently indicates the generation of a positive load, and the output of the second strain gauge 37B apparently indicates generation of a negative load. At this time, a force generated due to a difference between the expansion amount in the 2-axis direction of the linear motion table 33 and the expansion amount in the Z-axis direction of the rotating motor 20 is equally applied to the first arm 36A and the second arm 36B in opposite directions, and hence the output of the first strain gauge 37A and the output of the second strain gauge 37B have an equal absolute value and are different in positive or negative sign. For that reason, if the outputs of both the strain gauges are connected in parallel, the outputs due to the influence of temperature can cancel each other, and hence it is not necessary to separately perform correction in accordance with the temperature. Therefore, the load can be simply and accurately detected. Thus, the outputs of both the bridge circuits are connected in parallel, so that the change in voltage from which the influence of temperature is eliminated can be obtained, and this change in voltage has a value corresponding to the load generated between the shaft 10 and the workpiece W.

Note that in the present embodiment, two strain gauges 37 are provided, and instead of this, only one of the first strain gauge 37A or the second strain gauge 37B may be provided. In this case, the detected value of the strain gauge 37 is corrected in accordance with the temperature by use of known technology. Even in a case where one strain gauge 37 is provided, the output of the strain gauge 37 has a value corresponding to the load generated between the shaft 10 and the workpiece W. Consequently, the load generated between the shaft 10 and the workpiece W can be detected based on the detected value of the strain gauge 37. Furthermore, in the actuator 1, the strain gauge 37 is provided in the coupling arm 36. Alternatively, the strain gauge 37 may be provided in another member as long as the member generates strain in accordance with a load, when the load is generated between the shaft 10 and the workpiece W. For example, the strain gauge 37 may be provided in two bearings supporting the output shaft 21 of the rotating motor 20. Alternatively, the strain gauge 37 may be provided in the coupling arm 35, for example.

Thus, the strain gauges 37 are provided in the coupling arms 36, and hence it can be detected that the shaft 10 comes in contact with the workpiece W. Here, the AMP output includes noise according to the frequency of the commercial power supply. Accordingly, to accurately detect the load applied to the workpiece W, the noise has to be reduced by the low-pass filter 72. However, a phase delay is caused in the LPF output relative to the AMP output. Accordingly, in a case where the shaft 10 is being lowered, if the load applied to the workpiece W is detected based on the LPF output, a timing of stopping the linear motion motor 30 is possibly delayed, and an unnecessarily large load is possibly applied to the workpiece W. Furthermore, if a lowering speed of the shaft 10 is set low taking the phase delay of the LPF output into account, the tact time is increased. However, if the load is detected using the AMP output to eliminate the phase delay, an unnecessarily large load is possibly applied to the workpiece W due to the effect of the noise.

Accordingly, in the present embodiment, at the time of pickup of the workpiece W, the load applied to the shaft 10 and the workpiece W is detected based on the AMF output until the shaft 10 comes in contact with the workpiece W, and after the shaft 10 comes in contact with the workpiece W, the load applied to the shaft 10 and the workpiece W is detected based on the LPF output. Here, to determine whether or not the shaft 10 is in contact with the workpiece W, it suffices to determine whether or not the load applied to the shaft 10 is increased, and thus, accuracy of the load that is detected based on the AMP output is enough. Because the AMP output does not include a phase delay, the AMP output changes immediately after the shaft 10 comes in contact with the workpiece W, and contact of the shaft 10 with the workpiece W may thus be detected. Accordingly, the shaft 10 is not lowered more than necessary, and an unnecessarily large load is prevented from being applied to the workpiece W. On the other hand, after the shaft 10 comes in contact with the workpiece W, an appropriate load has to be applied to the workpiece W, and thus, the load has to be accurately detected. Accordingly, the load is detected using the LPF output with which the load can be detected with high accuracy. Then, feedback control of the linear motion motor 30 is performed using the LPF output. At this time, even if the LPF output includes a phase delay, effect of the phase delay is small if the shaft 10 is moved at a relatively low speed at the time of feedback control, and an unnecessarily large load may be prevented from being applied to the shaft 10. The same applies in the case of placing of the workpiece W. That is, at the time of placing of the workpiece W, the load applied to the shaft 10 and the workpiece W is detected based on the AMP output until the workpiece W comes in contact with the other member, and after the workpiece W comes in contact with the other member, the load applied to the shaft 10 and the workpiece Sf is detected based on the LPF output.

(Pick and Place Control)

Next, specific control of pick and place will be described. The controller 7 executes the predetermined program, to perform this pick and place. Additionally, in the present embodiment, the output of the strain gauge 37 (the AMP output or the LPF output) is replaced with the load, and the linear motion motor 30 is controlled based on this load, but instead of this, the linear motion motor 30 may be directly controlled based on the output of the strain gauge 37 (the AMP output or the LPF output). First, pickup processing will be described. FIG. 5 is a flowchart illustrating flow of the pickup processing. The present flowchart is executed by the controller 7 every predetermined time. This predetermined time is set in accordance with tact time. In an initial state, the shaft 10 is at a sufficient distance from the workpiece W.

In step S101, the positive pressure solenoid valve 63A and the negative pressure solenoid valve 63B are both closed. That is, the pressure at the tip 10A of the shaft 10 is set to the atmospheric pressure. Furthermore, the function of the low-pass filter 72 is stopped. Accordingly, the AMP output is input to the controller 7. That is, a signal not including the phase delay caused by the low-pass filter 72 is input to the controller 7. In step S102, the shaft 10 is lowered. That is, the linear motion motor 30 is driven to move the shaft 10 downward in the Z-axis direction. Additionally, the position of the mover 32 may be detected by the linear encoder 38, and the shaft 10 may be lowered at a relatively high speed until the position of the mover 32 reaches a predetermined position. The predetermined position here is a position of the mover 32 immediately before the shaft 10 comes in contact with the workpiece W. This predetermined position is set in advance for each workpiece W.

In step S103, the load applied to the shaft 10 is detected based on the AMP output. In step S104, it is determined whether or not the load applied to the shaft 10 is equal to or larger than the first predetermined load. The first predetermined load herein is the load by which it is determined that the shaft 10 comes in contact with the workpiece W. That is, in the present step S104, it is determined whether or not the shaft 10 is in contact with the workpiece W. In the present embodiment, the first predetermined load corresponds to the threshold according to the present invention. If affirmative determination is made in the step S104, the processing advances to step S105, and if negative determination is made, the processing returns to the step S103. Therefore, the linear motion motor 30 moves the shaft 10 downward in the Z-axis direction until the load applied to the shaft 10 reaches the first predetermined load or more.

In the step S105, lowering of the shaft 10 by the linear motion motor 30 is stopped. In step S106, the low-pass filter 72 is caused to function. Then, the LPF output is input to the controller 7. Then, in step S107, feedback control of the linear motion motor 30 based on the LPF output is started. In this feedback control, the load applied to the shaft 10 is detected based on the LPF output, and the linear motion motor 30 is controlled such that the load comes close to a second predetermined load. The second predetermined load is a load larger than the first predetermined load, and is a load appropriate for pickup of the workpiece W. Additionally, in the present embodiment, the second predetermined load corresponds to the predetermined load according to the present invention. An existing technique may be used for this feedback control. The load that is detected at this time is, although a phase delay is included, highly accurate because the noise is reduced. Furthermore, even when there is a phase delay, the moving speed of the shaft 10 is low, and the effect of the phase delay is small. Additionally, in the present embodiment, lowering of the shaft 10 by the linear motion motor 30 is stopped in the step S105, and then, feedback control of the linear motion motor 30 is started in the step S107, but lowering of the shaft 10 by the linear motion motor 30 does not necessarily have to be stopped, and the processing of the step S107 may be omitted. That is, feedback control of the linear motion motor 30 may be started in the step S107 in a state where the linear motion motor 30 is performing lowering.

In step S108, the negative pressure solenoid valve 63B is opened. Note that a closed valve state of the positive pressure solenoid valve 63A is maintained. Consequently, the negative pressure is generated at the tip 10A of the shaft 10, to suck the workpiece W to the tip 10A of the shaft 10. Then, the feedback control is ended in step S109, and the shaft 10 is raised in step S110. At this time, the linear motion motor 30 moves the shaft 10 by a predetermined distance upward in the Z-axis direction. At this time, the shaft 10 may be rotated by the rotating motor 20 as required. Then, in step S111, the function of the low-pass filter 72 is stopped. Thus, the workpiece W can be picked up.

Additionally, the processing of the step S109 may be performed after a predetermined time from when the processing of the step S108 is ended. The predetermined time here is set as a time over which the pressure at the tip 10A of the shaft 10 becomes substantially the same as the negative pressure supplied by the air control mechanism 60. This allows the shaft 10 to be raised after the pressure at the tip 10A falls to a pressure at which the workpiece W can be picked up, and the workpiece W may be more securely picked up. Moreover, feedback control is performed from the step S107 to the step S109 such that the load applied to the shaft 10 reaches the second predetermined load, but instead of this, the linear motion motor 30 may be controlled until the load applied to the shaft 10 reaches the second predetermined load, and the linear motion motor 30 may be stopped when the load applied to the shaft 10 reaches the second predetermined load, and the processing of the step S108 may then be performed. That is, at the time of pickup of the workpiece W, feedback control of the linear motion motor 30 based on the LPF output does not necessarily have to be performed.

Next, place processing will be described. FIG. 6 is a flowchart illustrating flow of the place processing. The place processing is executed by the controller 7, after the pickup processing illustrated in FIG. 5. At start of the place processing, the workpiece W is sucked to the tip of the shaft 10. That is, the positive pressure solenoid valve 63A is closed, and the negative pressure solenoid valve 63B is opened. Furthermore, the function of the low-pass filter 72 is stopped by the processing of the step S111. In step S201, the shaft 10 is lowered. That is, the linear motion motor 30 is driven to move the shaft 10 downward in the Z-axis direction. The lowering speed at this time may be set to a same speed as the lowering speed set in the step S102, or may be set to a different lowering speed. In step S202, the lead applied to the shaft 10 is detected based on the AMP output. In step S203, it is determined whether or not the load applied to the shaft 10 is equal to or larger than a third predetermined load. Note that the third predetermined load is the load by which it is determined that the workpiece W comes in contact with another member. The third predetermined load may be the same as or different from the first predetermined load in the step S104. Additionally, in the present embodiment, the third predetermined load corresponds to the threshold according to the present, invention. If affirmative determination is made in the step S203, the processing advances to step S204, and if negative determination is made, the processing returns to the step S202. Therefore, the linear motion motor 30 moves the shaft 10 downward in the Z-axis direction until the load applied to the shaft 10 reaches the third predetermined load or more.

In the step S204, lowering of the shaft 10 by the linear motion motor 30 is stopped. In step S205, the low-pass filter 72 is caused to function. Then, the LPF output is input to the controller 7. Then, in step S206, feedback control of the linear motion motor 30 based on the LPF output is started. In this feedback control, the load applied to the shaft 10 is detected based on the LPF output, and the linear motion motor 30 is controlled such that the load comes close to a fourth predetermined load. The fourth predetermined load is a load larger than the third predetermined load, and is a load appropriate for placing of the workpiece W. Additionally, in the present embodiment, the fourth predetermined load corresponds to the predetermined load according to the present invention. An existing technique may be used for this feedback control. The load that is detected at this time is, although a phase delay is included, highly accurate because the noise is reduced. Furthermore, even when there is a phase delay, the moving speed of the shaft 10 is low, and the effect of the phase delay is small. Additionally, in the present embodiment, lowering of the shaft 10 by the linear motion motor 30 is stopped in the step S204, and then, feedback control of the linear motion motor 30 is started in the step S206, but lowering of the shaft 10 by the linear motion motor 30 does not necessarily have to be stopped, and the processing of the step S204 may be omitted. That is, feedback control of the linear motion motor 30 may be started in the step S206 in a state where the linear motion motor 30 is performing lowering.

In step S207, the positive pressure solenoid valve 63A is opened, and the negative pressure solenoid valve 63B is closed. Consequently, the positive pressure is generated at the tip 10A of the shaft 10, to remove the workpiece W from the shaft 10. Then, the feedback control is ended in step S208, and the shaft 10 is raised in step S205. That is, the linear motion motor 30 moves the shaft 10 by a predetermined distance upward in the Z-axis direction. At this time, the shaft 10 may be rotated by the rotating motor 20 as required. Then, in step S210, the function of the low-pass filter 12 is stopped. Thus, the workpiece W can be placed.

Additionally, the processing of the step S208 may be performed after a predetermined time from when the processing of the step S207 is ended. The predetermined time here is set as a time over which the pressure at the tip 10A of the shaft 10 becomes substantially the same as the positive pressure supplied by the air control mechanism 60. This allows the shaft 10 to be raised after the pressure at the tip 10A is increased to a pressure at which the workpiece W can be removed, and the workpiece W may be more securely placed. Moreover, feedback control is performed from the step S206 to the step S208 such that the load applied to the shaft 10 reaches the fourth predetermined load, but instead of this, the linear motion motor 30 may be controlled until the load applied to the shaft 10 reaches the fourth predetermined load, and the linear motion motor 30 may be stopped when the load applied to the shaft 10 reaches the fourth predetermined load, and the processing of the step S207 may then be performed. That is, at the time of placing of the workpiece W, feedback control of the linear motion motor 30 based on the LPF output does not necessarily have to be performed.

As described above, according to the actuator 1 of the present embodiment, the load applied to the shaft 10 can be detected based on the output of the strain gauge 37. Then, an appropriate load can be applied to the workpiece W by controlling the linear motion motor 30 based on the detected load, and thus, pickup and placing of the workpiece W may be more securely performed while preventing the workpiece W from being damaged.

Furthermore, a phase delay may be prevented from being caused in the detected load, by stopping the function of the low-pass filter 72 until the shaft 10 comes in contact with the workpiece W. Accordingly, that the load applied to the shaft 10 is increased may be swiftly detected. That is, contact of the shaft 10 with the workpiece W may be swiftly detected at the time of pickup, or contact of the workpiece W with the other member may be swiftly detected at the time of placing. The load detected at this time is affected by the noise from the commercial power supply 8, but at this time, because it suffices if contact of the shaft 10 with the workpiece W is detected, an accurate load does not have to be determined. That is, by detecting the load based on the AMP output, a change in the load with no phase delay may be detected, and an unnecessarily large load may be prevented from being applied to the workpiece W. On the other hand, after the shaft 10 comes in contact with the workpiece W, the low-pass filter 72 is caused to function and the load applied to the workpiece W is more accurately detected, and the workpiece W may thus be prevented from being damaged, for example. At this time, the shaft 10 does not have to be moved at a high speed, and the effect is small even if there is a phase delay.

Second Embodiment

In the first embodiment, the effect of a phase delay is reduced by stopping the function of the low-pass filter 72. In contrast, in a present embodiment, the phase delay is reduced by changing the cut-off frequency of the low-pass filter 72. That is, in the present embodiment, at the time of pickup of the workpiece W, the cut-off frequency of the low-pass filter 72 is lowered after the shaft 10 comes in contact with the workpiece W, compared to before the contact. Furthermore, in the present embodiment, at the time of placing of the workpiece W, the cut-off frequency of the low-pass filter 72 is lowered after the workpiece W comes in contact with the other member, compared to before the contact with the other member. Here, by lowering the cut-off frequency, the phase delay is increased but the effect of the noise is reduced. Accordingly, by lowering the cut-off frequency of the low-pass filter 72 after the shaft 10 comes in contact with the workpiece W, compared to before the contact, the noise that is included in the LPF output after the shaft 10 comes in contact with the workpiece W may be reduced, and the load applied to the workpiece W may toe more accurately determined. Furthermore, before the shaft 10 comes in contact with the workpiece W, the phase delay is small, and contact of the shaft 10 with the workpiece W may be more swiftly detected. The same applies in the case of placing of the workpiece W.

(Pick and Place Control)

Next, specific control of pick and place will be described. The controller 7 executes a predetermined program, to perform this pick and place. Additionally, in the present embodiment, the output of the strain gauge 37 (the LPF output) is replaced with the load, and the linear motion motor 30 is controlled based on this load, but instead of this, the linear motion motor 30 may be directly controlled based on the output of the strain gauge 37 (the LPF output). First, pickup processing will be described. FIG. 7 is a flowchart illustrating flow of pickup processing. The present flowchart is executed by a controller 7 every predetermined time. This predetermined time is set in accordance with the tact time. In an initial state, the shaft 10 is at a sufficient distance from the workpiece W. A step in which the same processing as that of the flowchart illustrated in FIG. 5 is performed is denoted with the same reference numeral or symbol and description is omitted.

In step S301, the positive pressure solenoid valve 63A and the negative pressure solenoid valve 63B are both in a closed state. That is, the pressure at the tip 10A of the shaft 10 is set to the atmospheric pressure. Moreover, the cut-off frequency of the low-pass filter 72 is set to a relatively high frequency (hereinafter "high frequency"). The LPF output is input to the controller 7f but because the cut-off frequency is set to a high frequency, a signal that is little affected by the phase delay caused by the low-pass filter 72 is input to the controller 7. The cut-off frequency at this time is set higher than a cut-off frequency that is set in step S302 described later. Then, the step S102 is performed.

Furthermore, when the processing of the step S105 is complete, step S302 is performed. In the step S302, the cut-off frequency of the low-pass filter 72 is set to a relatively low frequency (hereinafter "low frequency"). Then, the step S107 is performed. Moreover, after the shaft 10 is raised in the step S110, step S303 is performed, and the cut-off frequency of the low-pass filter 72 is set to the high frequency. The workpiece W can thus be picked up.

Next, place processing will be described. FIG. 8 is a flowchart illustrating flow of place processing. The place processing is executed by the controller 7 after the pickup processing illustrated in FIG. 7. At start of the place processing, the workpiece W is sucked to the tip of the shaft 10. That is, the positive pressure solenoid valve 63A is closed, and the negative pressure solenoid valve 63B is opened. Moreover, the cut-off frequency of the low-pass filter 72 is set to the high frequency by the processing of the step S303. Additionally, a step in which the same processing as that of the flowchart illustrated in FIG. 6 is performed is denoted with the same reference numeral or symbol and description is omitted.

When the processing of the step S204 is complete, step S401 is performed, and the cut-off frequency of the low-pass filter 72 is set to the low frequency. Then, the step S206 is performed. Moreover, when the processing of the step S209 is complete, step S402 is performed, and the cut-off frequency of the low-pass filter 72 is set to the high frequency. The workpiece W can thus be placed.

As described above, with the actuator 1 according to the present embodiment, the cut-off frequency of the low-pass filter 72 is set to the high frequency until the shaft 10 comes in contact with the workpiece W at the time of pickup or until the workpiece W comes in contact with the other member at the time of placing, and thus, a phase delay in the detected load may be reduced. Accordingly, contact of the shaft 10 with the workpiece W may be swiftly detected at the time of pickup, or contact of the workpiece W with the other member may be swiftly detected at the time of placing. The load detected at this time is affected by the noise from the commercial power supply 8, but at this time, because it suffices if contact of the shaft 10 with the workpiece W or contact of the workpiece W with the other member is detected, an accurate load does not have to be determined. That is, by setting the cut-off frequency of the low-pass filter 12 to the high frequency, a load with a small phase delay may be detected, and an unnecessarily large load may be prevented from being applied to the workpiece W. On the other hand, after the shaft 10 comes in contact with the workpiece W at the time of pickup, or after the workpiece W comes in contact with the other member at the time of placing, the cut-off frequency of the low-pass filter 72 is set to the low frequency to more accurately detect the load applied to the workpiece W, and the workpiece W may thus be prevented from being damaged. At this time, the shaft 10 does not have to be moved at a high speed, and the effect is small even if there is a phase delay.

DESCRIPTION OF THE REFERENCE NUMERALS AND SYMBOLS 1 actuator
2 housing
10 shaft
10A tip
11 hollow part
20 rotating motor
22 stator
23 rotor
30 linear motion motor
31 stator
32 mover
36 coupling arm
37 strain gauge
50 shaft housing
60 air control mechanism

The invention claimed is:

1. An actuator comprising:
   a shaft;
   a linear motion motor including a stator and a mover, wherein movement of the mover in parallel with a central axis of the shaft relative to the stator of the linear motion motor causes the shaft to move in a direction of the central axis;
   a connecting member that is at least a part of a member connecting the mover of the linear motion motor and the shaft;
   a force sensor provided in the connecting member, an output of the force sensor being according to a force applied to the connecting member;
   an amplifier that amplifies the output of the force sensor;
   a low-pass filter that reduces components of frequencies higher than a cut-off frequency, among components of frequencies included in an output from the amplifier; and
   a control device that detects a load applied to the shaft, based on the output from the amplifier, until the shaft or a member associated with the shaft comes in contact with an other member, and that detects the load applied to the shaft, based on an output from the low-pass filter, after the shaft or the member associated with the shaft comes in contact with the other member.

2. The actuator according to claim 1, wherein, in a case where the load that is detected is equal to or larger than a threshold, the control device determines that the shaft or the member associated with the shaft is in contact with the other member.

3. The actuator according to claim 1, wherein, after the shaft or the member associated with the shaft comes in contact with the other member, the control device performs feedback control of the linear motion motor to bring the load that is detected closer to a predetermined load.

4. The actuator according to claim 3, wherein
the shaft includes a hollow part formed on a tip side of the shaft such drat an interior of the shaft is hollow,
the actuator further comprises a supply part that supplies a negative pressure to the hollow part, and
the control device causes the negative pressure to be supplied from the supply part to the hollow part at a time of pickup, during execution of the feedback control.

5. The actuator according to claim 3, wherein
the shaft includes a hollow part formed on a tip side of the shaft such that an interior of the shaft is hollow,
the actuator further comprises a supply part that supplies au atmospheric pressure or a positive pressure to the hollow part, and
the control device causes the atmospheric pressure or the positive pressure to be supplied from the supply part to the hollow part at a time of placing, during execution of the feedback control.

6. The actuator according to claim 1, wherein
the connecting member includes a first member and a second member that are provided in a shifted manner in the direction of the central axis of the shaft, and
the force sensor includes a strain gauge provided on each of surfaces that are provided on the first member and the second member, respectively, the surfaces facing in a same direction and being parallel to each other and orthogonal to the central axis of the shaft.

7. An actuator comprising:
a shaft;
a linear motion motor including a stator and a mover, wherein movement of the mover in parallel with a central axis of the shaft relative to the stator of the linear motion motor causes the shaft to move in a direction of the central axis;
a connecting member that is at least a part of a member connecting the mover of the linear motion motor and the shaft;
a force sensor provided in the connecting member, an output of the force sensor being according to a force applied to the connecting member;
an amplifier that amplifies the output of the force sensor;
a low-pass filter that reduces components of frequencies higher than a cut-off frequency, among components of frequencies included in an output from the amplifier; and
a control device that detects a load applied to the shaft, based on an output from the low-pass filter, wherein the cut-off frequency is made higher until the shaft or a member associated with the shaft comes in contact with an other member than after the contact.

8. The actuator according to claim 2, wherein, in a case where the load that is detected is equal to or larger than a threshold, the control device determines that the shaft or the member associated with the shaft is in contact with the other member.

9. The actuator according to claim 7, wherein, after the shaft or the member associated with the shaft comes in contact with the other member, the control device performs feedback control of the linear motion motor to bring the load that is detected closer to a predetermined load.

10. The actuator according to claim 9, wherein
the shaft includes a hollow part formed on a tip side of the shaft such that an interior of the shaft is hollow,
the actuator further comprises a supply part that supplies a negative pressure to the hollow part, and
the control device causes the negative pressure to be supplied from the supply part to the hollow part at a time of pickup, during execution of the feedback control.

11. The actuator according to claim 9, wherein
the shaft includes a hollow part formed on a tip side of the shaft such that an interior of the shaft is hollow,
the actuator further comprises a supply part that supplies an atmospheric pressure or a positive pressure to the hollow part, and
the control device causes the atmospheric pressure or the positive pressure to be supplied from the supply part to the hollow part at a time of placing, during execution of the feedback control.

12. The actuator according to claim 7, wherein
the connecting member includes a first member and a second member that are provided in a shifted manner in the direction of the central axis of the shaft, and
the force sensor includes a strain gauge provided on each of surfaces that are provided on the first member and the second member, respectively, the surfaces facing in a same direction and being parallel to each other and orthogonal to the central axis of the shaft.

* * * * *